United States Patent
Rus et al.

(10) Patent No.: US 10,176,244 B2
(45) Date of Patent: Jan. 8, 2019

(54) TEXT CHARACTERIZATION OF TRAJECTORIES

(71) Applicants: Daniela Rus, Weston, MA (US); Dan Feldman, Cambridge, MA (US); Cynthia Rueyi Sung, Houston, TX (US); Andrew Kiminari Sugaya, Winter Park, FL (US)

(72) Inventors: Daniela Rus, Weston, MA (US); Dan Feldman, Cambridge, MA (US); Cynthia Rueyi Sung, Houston, TX (US); Andrew Kiminari Sugaya, Winter Park, FL (US)

(73) Assignee: Massachusetts Institute of Technology, Cambridge, MA (US)

( * ) Notice: Subject to any disclaimer, the term of this patent is extended or adjusted under 35 U.S.C. 154(b) by 925 days.

(21) Appl. No.: 13/940,822

(22) Filed: Jul. 12, 2013

(65) Prior Publication Data
US 2014/0019450 A1 Jan. 16, 2014

Related U.S. Application Data

(60) Provisional application No. 61/670,771, filed on Jul. 12, 2012.

(51) Int. Cl.
*G06F 17/30* (2006.01)

(52) U.S. Cl.
CPC .. *G06F 17/30595* (2013.01); *G06F 17/30241* (2013.01)

(58) Field of Classification Search
CPC .................................................. G06F 17/3087
See application file for complete search history.

(56) References Cited

U.S. PATENT DOCUMENTS

| | | | |
|---|---|---|---|
| 2009/0216435 A1 | 8/2009 | Zheng et al. | |
| 2009/0216787 A1* | 8/2009 | Wang | G06F 17/30241 |
| 2009/0222482 A1 | 9/2009 | Klassen et al. | |
| 2011/0256881 A1 | 10/2011 | Huang et al. | |
| 2013/0022234 A1* | 1/2013 | U S | G06T 7/20 |
| | | | 382/103 |

OTHER PUBLICATIONS

Feldman et al., "An Effective Coreset Compression Algorithm for Large Scale Sensor Networks", Apr. 20, 2012.*
Deerwester et al., "Indexing by Latent Semantic Analysis", 1990, John Wiley & Sons, pp. 391-407.*

* cited by examiner

*Primary Examiner* — Hung Q Pham
(74) *Attorney, Agent, or Firm* — Occhiuti & Rohlicek LLP

(57) ABSTRACT

In one embodiment, processing location data collected with a mobile device having a positioning system includes accepting trajectory data representing successive geographic positions of the mobile device, where the positions are associated with corresponding times. A set of coordinate segments is determined to represent in the accepted trajectory data, such that the trajectory data represent repeated traversals of at least some of the coordinate segments. A textual characterization is associated with each segment of the determined set of coordinate segments, and then a representation of the trajectory data (for example, an electronic diary) is formed using the textual characterization of the coordinate segments and stored. In some examples, a text based query associated with the accepted trajectory data is accepted and a response is determined using the stored representation of the trajectory data.

22 Claims, 5 Drawing Sheets

TEXT CHARACTERIZATION OF TRAJECTORIES

CROSS-REFERENCE TO RELATED APPLICATIONS

This application claims the benefit of U.S. Provisional Application No. 61/670,771, titled "SYSTEM FOR UTILIZING SENSOR NETWORK DATA IN A SEARCHABLE DIARY," filed on Jul. 12, 2012, which is incorporated herein by reference.

BACKGROUND

This invention relates to characterization of trajectories, and more particularly to use of text characterization for tasks including text-based querying and summarization.

Mobile sensor networks such as smart phones are playing an increasingly important role in our lives, and can be the source of very large and useful data about the users carrying them. Today it is not possible and/or is computationally prohibitive to take signals generated from sensors such as GPS streams and convert them into text-searchable systems. For an individual mobile node/user, such a system would automatically create a textual diary that captures the spatio-temporal activities of the mobile node/user. For example, the user could pose the query "What are the restaurants I visited during Sensys 2012?" or "What are the roads I drove on today?". For groups of mobile nodes/users, such a system captures their spatio-temporal interactions, for example "Where did I meet with X during Sensys 2012?", or "When did Y and X meet for the first time?"

Translating massive amounts of raw GPS data points into useful human-understandable information is not currently possible because (a) compared to fields such as machine learning and text mining, very little is known about handling these kinds of data sets, both in theory and practice, (b) the user interface of existing GPS applications, (e.g., Google Latitude) is more oriented to map-navigation than text search, and (c) the data involved can be huge (e.g., a single smart phone can generate on the order of 1 GByte of data per day).

The idea of collecting location data using the mobile phone is not new. For example, some systems have been used to collect users' GPS data from their mobile phones and determine their common transportation modes and environmental impact. Applications for tracking user activities and locations have also appeared in the commercial realm. Commercial applications are available that attempt to track user activities and locations. One such system allows users to check-in to locations that are confirmed to be nearby using GPS location data and produces a searchable timeline; however, data collection in this system is not automated. A system called Google Latitude that is available today can track where a user has been, once known locations are set up on the user's phone. A dashboard shows the user's activity on a high-level scale (i.e., work, home, out), as well as a list of previously visited locations. However, the current applications lack low-level activity recognition (e.g., "drinking coffee") and searchable history. To the inventors' knowledge, no previous system provides text search capabilities over raw GPS-data.

SUMMARY

In one aspect, in general, processing location data collected with a mobile device having a positioning system includes accepting trajectory data representing successive geographic positions of the mobile device, where the positions are associated with corresponding times. A set of coordinate segments is determined to represent in the accepted trajectory data, such that the trajectory data represent repeated traversals of at least some of the coordinate segments. A textual characterization is associated with each segment of the determined set of coordinate segments, and then a representation of the trajectory data is formed using the textual characterization of the coordinate segments and stored.

Aspects may include one or more of the following features.

Forming and storing the representation of the trajectory data includes forming and storing a data representation that includes a sequence of records. Each record includes a reference to one of the coordinate segments, and a specification of a time interval associated with a traversal of successive geographic positions in the accepted trajectory data associated with the referenced coordinate segment. In some examples, the stored data comprises an electronic "diary" associated with the trajectory of the mobile device. In some examples, the reference to the one of the coordinate segments provides a reference to stored data representing the textual characterization of the coordinate segment.

A textual summary of the trajectory data is provided using the stored representation of the trajectory data. In some examples, such textual data is used to annotate a graphical representation of the trajectory.

Determining the set of coordinate segments representing in the accepted trajectory data includes identifying a set of segments in a trajectory space representing the successive geographic positions, each of said segments representing a temporal traversal from a first geographic position to a second geographic position from a first time to a second time. For each segment in the trajectory space a corresponding segment in a coordinate space is identified, wherein the segment in the coordinate space represents one or more traversals from a first geographic position to a second geographic position. For at least some segments in the coordinate space, multiple segments in the trajectory space correspond to said segment in the coordinate space representing multiple instances in the accepted trajectory data of traversal of the segment in the coordinate space.

Identifying the segments in the trajectory space and the corresponding segments in the coordinate space includes applying a optimization procedure to jointly determine said segments.

Determining the set of coordinate segments includes selecting a number of segments in the trajectory space and selecting a number of segments in the coordinate space, and applying the optimization procedure includes identifying the segments includes optimizing a match of the segments in the trajectory space to the successive geographic positions in the accepted trajectory data according to the selected numbers of segments.

Associating the textual characterization with a segment of the determined set of coordinate segments includes determining at least one geographic position associated with the coordinate segment, providing the geographic position to data source, and receiving data including the textual characterization from the data source.

The method further includes accepting a text based query associated the with accepted trajectory data, and determining a response to the query using the stored representation of the trajectory data.

Determining the response includes computing a mapping of the text based query to a numerical vector, and comparing the computed numerical vector with a numerical vectors determined from the textual characterizations of the segments representing the trajectory data.

A latent semantic analysis is performed using text associated with the coordinate segments, and determining the response to the query uses a result of the latent semantic analysis.

A subset (for example, a "coreset") of the accepted trajectory data is identified, and determining the set of coordinate segments includes identifying said segments to represent the subset of the accepted trajectory data.

Identifying the subset of the trajectory data includes applying a computer-implemented compression procedure to the accepted trajectory data to form the subset of the trajectory data representing a subject of the geographic positions represented in the accepted trajectory data, the number of positions in the subject of geographic positions having a number substantially smaller than the first number of geographic positions in the accepted trajectory data and providing a bound on an error associated with representing the accepted trajectory data by the subject of the trajectory data.

Applying the compression procedure includes: determining a first plurality of segments in a trajectory space according to a procedure with a property that the number of segments in the first plurality of segments grows at most as a logarithm of the number of successive geographic positions represented in the accepted trajectory data; partitioning the successive geographic positions into a plurality of parts each part being associated with a corresponding different segment of the first plurality of segments in the trajectory space; for each part of the plurality of parts, selecting a subset of the successive geographic positions; and combining the selected subsets to form the subset of geographic positions represented in the subject of the trajectory data.

The method is executed on a processor in the mobile device.

Accepting the trajectory data comprises accepting said data at a server computer over a wireless data network from the mobile device, and then determining the set of coordinate segments at the server computer.

A statistical characterization (for example, a Markov Chain model) of the sequence of coordinate segments represented in the trajectory data is formed.

Trajectory data is accepted from a plurality of mobile devices, and the set of coordinate segments is determined to represent the trajectory data from the plurality of mobile device. In some examples, these coordinate segments are used to form a map associated with the mobile devices.

In another aspect, in general, software stored on a non-volatile computer-readable medium causes a processing system to: accept trajectory data representing successive geographic positions of a mobile device, said positions being associated with corresponding times; determine a set of coordinate segments represented in the accepted trajectory data, the trajectory data representing repeated traversals of at least some of the coordinate segments; associate a textual characterization with each segment of the determined set of coordinate segments; and form and store a representation of the trajectory data using the textual characterization of the coordinate segments. In some examples, the software causes the system to accept from the mobile device a text based query associated the with accepted trajectory data, then determine a response to the query using the stored representation of the trajectory data and then provide the response to the mobile device.

One advantage of aspects include providing an way of applying text-based queries to trajectory data in a computationally efficient manner, for example, without requiring substantial querying of data sources associating locations with associated text at the time of processing the query.

Other features and advantages of the invention are apparent from the following description, and from the claims.

DESCRIPTION

Figure 1:
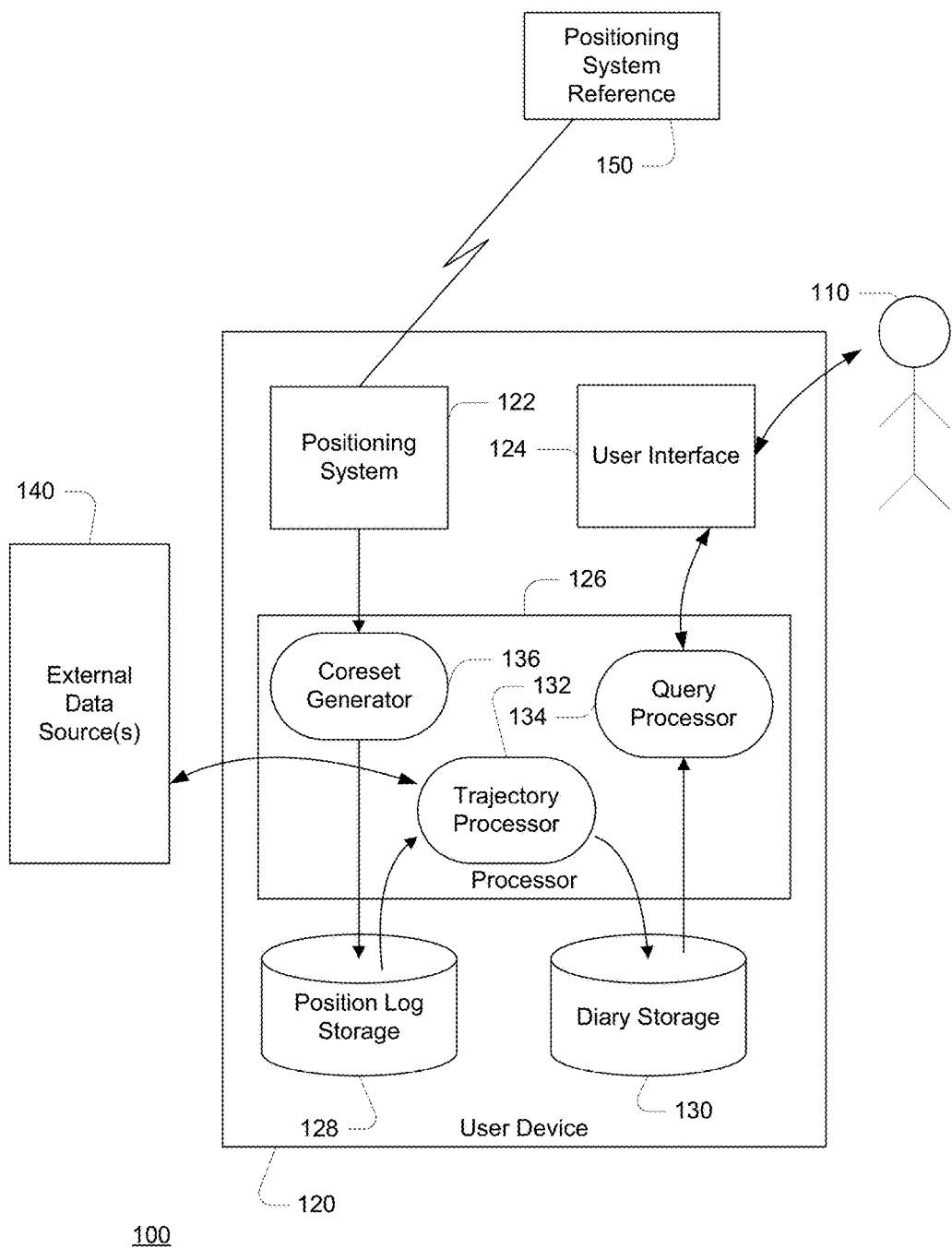
FIG. 1 is a block diagram of a system implementing text characterization of trajectories.

Referring to FIG. 1, a system 100 includes a user device 120, for instance a smart phone, that includes a positioning system 122 that can provide successive geographic location measurements for the device. In some implementations, the positioning system 122 in the device includes a radio frequency receiver and makes use of positioning system references 150, for instance Global Positioning System (GPS) satellites, and WiFi access points in known or estimated positions. However, it should be understood that the approaches described below are applicable to any of a wide range of positioning or location tracking technologies, which do not necessarily use known references (e.g., using image tracking, dead reckoning, etc.).

The user device 120 includes a user interface 124, for instance providing an output on a graphical user interface screen and accepting input by voice, keyboard and/or touch input, through which a user 110 can interact with the device. One function of the user interface is to support text based (e.g., typed or spoken) user queries whose results depend on past position information provided by the positioning system 122. Examples of the types of queries that are supported by one or more implementations of the approach include "Where did I buy books last week?", "How much time do I spend at coffee shops?", "Tell me what I did yesterday?" The responses to these queries may for instance be textual ("Quantum Books"), quantitative (85 minutes per day), or visual (e.g., a pointer on a street map). In general, the system does not require the user to have previously annotated information about his or her travels. Rather, the system automatically interprets automatically logged position information to form a "diary" of the user's activities, and it is this diary that is then used as a basis for answering the user's queries.

Note that the position system 122 generally produces a very large amount of data, which can be considered to consist of (position, time) samples indicating that the device was at the indicated position at the indicated time. In the discussion below, the position values are represented as a pair of real numbers, for instance latitude and longitude although clearly other position representations (e.g., including altitude, using different bases, etc.) can be used. In the discussion below, the position values (p) are assumed to be in $\mathbb{R}^2$ and the time values in $\mathbb{R}^1$, so that samples from the positioning system are in $\mathbb{R}^3$.

In one embodiment, the user device 120 includes a processor 126 that implements a number of procedures that transform data that is received by the processor for storage or presentation to the use. One software module implemented in the processor is a coreset generator 136, which accepts the position samples from the positioning system and identifies a subset of the samples that provides an accurate representation of the raw data. An approach to this coreset generation is described in detail in co-pending U.S. patent application Ser. No. 13/861,697, titled "DATA CORESET COMPRESSION," filed on Apr. 12, 2013, and published as U.S. Pat. Pub. 2013/0275400, on Apr. 12, 2013, as well as in an associated publication "An Effective Coreset Compression Algorithm for Large Scale Sensor Networks," *Proc. 11th ACM/IEEE Conf. on Information Processing in Sensor Networks* (IPSN) Apr. 16-20, 2012, Beijing, China. The contents of this application, as well as the associated conference publication are incorporated herein by reference. However it should be understood that the coreset generator 136 is not essential to the operation of the system, and could be omitted entirely or replaced with an alternative approach to compression or data reduction of the raw position samples output from the positioning system 122.

Before continuing with a detailed description of the operation of the user device, it should be stressed that an implementation that is hosted entirely within a user device (e.g., a smartphone) is but one embodiment of the approach. Other embodiments may host one or more of the processing and storage components of the system on other computers. As one such example, the coreset generator or the trajectory processor may be hosted on a server computer, while the query processor component is hosted on the user device.

A technical feature of the approach implemented by the system is the distilling of logged position data into a form (i.e., the diary) that can be efficiently queried, in particular using text-based queries. Continuing to refer to FIG. 1, logged position data is passed from the positioning system 122 into a log storage 128, such as a non-volatile semiconductor memory. Then a trajectory processor 132 distills the logged data and stores a diary in a diary storage 130. It is this diary that is accessed by a query processor 134, which processes a user's query and determines the response to pass back to the user. The distillation effectively compresses the position data while retaining the most significant information in that data for processing queries. Furthermore, forming of the diary makes use of a history of a user's activities (or in some embodiments a history of multiple users' activities), which permits identification (e.g., clustering according to their spatial and temporal patterns) of repeated activities and then representation of the diary in terms of such repeated activities. The use of repeated activities not only provides a compression of the information, but also increases accuracy of interpreting the nature of those activities because more instances are available for automated analysis.

Figure 2:
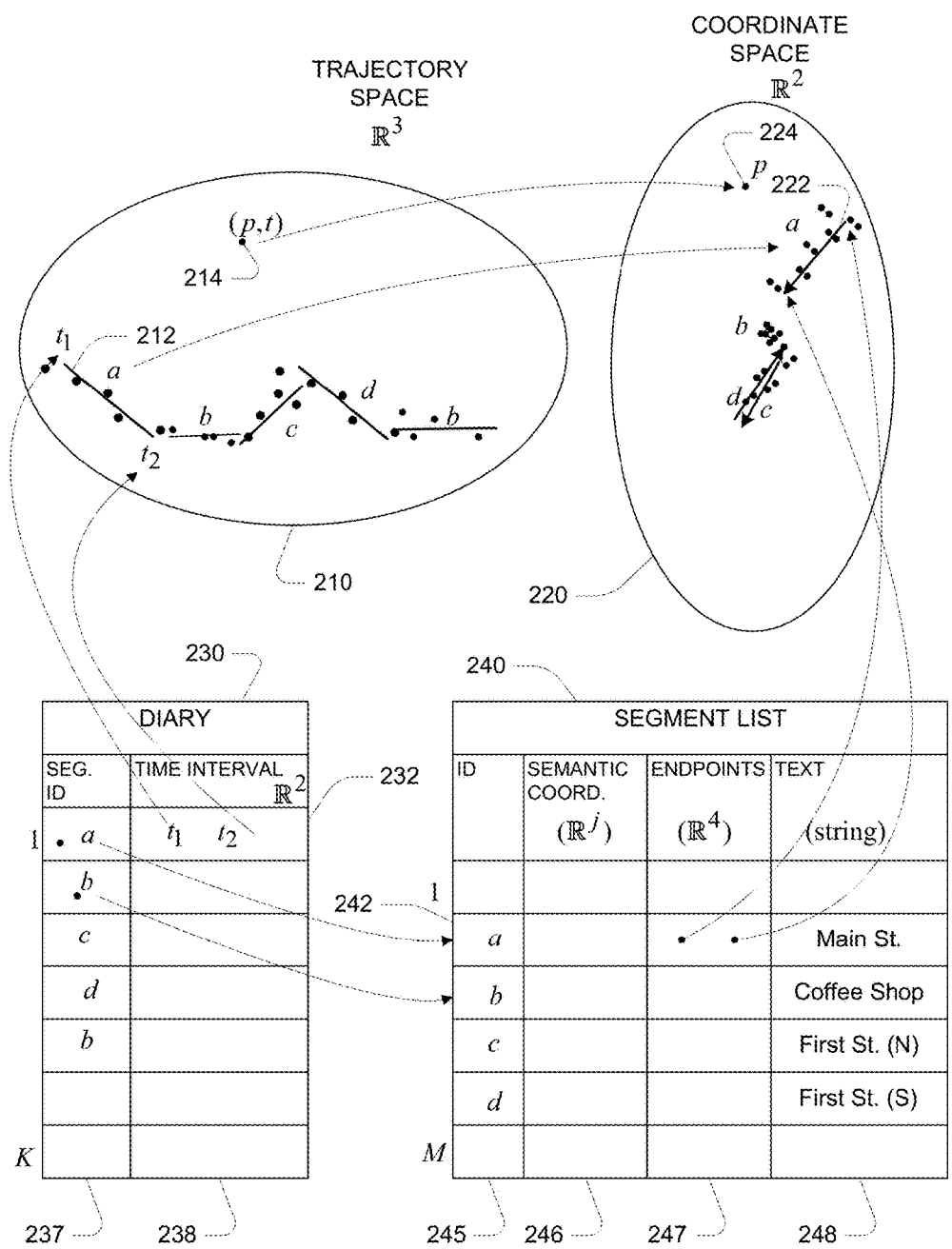
FIGS. 2-3 illustrate an interrelationship of elements of data structures stored and/or used in processing of acquired position data.

Referring to FIG. 2, position samples from the positioning system 122 (see FIG. 1), optionally processed by the coreset generator 136 (see FIG. 1), can represented as sample points in a trajectory space 210. As introduced above, each point (p,t) (214) represents a position (p) and a corresponding time (t). As the user device travels and its position is tracked by the positioning system, successive points are stored in the position log storage 128 (see FIG. 1) representing points in the trajectory space. Ultimately using procedures described fully below, these points are processed to form a diary 230, stored in the diary storage 130 (see FIG. 1). The diary summarizes logged position data as a series of diary records 232. Each diary record has at least two fields. A segment identifier field 237 has a reference to "segment" in a defined set of segments and a time interval field 238. The time interval fields of the diary records define the start and end time associated with each diary record.

Each segment referenced by a diary record is associated with a line segment in the trajectory space 210. As an example, as illustrated in FIG. 2, the first diary record 232 is associated with a line segment 212 in the trajectory space. This segment is labeled "a" and is indicated to extend over the interval $(t_1, t_2)$ in the time interval field 238 of the diary record 232. As illustrated in FIG. 2, the series of (position, time) samples in the trajectory space are represented by a series of records 232 in the diary 230, with each diary record corresponding to a line segment in the trajectory space.

Each point (p,t) 214 in the trajectory space 210 corresponds to a point (p) 224 in a coordinate (e.g., geographic) space 220. Therefore each line segment 212 in the trajectory space 210 corresponds to a directed line segment 222 (or possibly a single point) in the coordinate space 220. As introduced above, each record in the diary 230 references a defined segment. The set of defined segments are maintained in a segment list 240, where each segment has one segment record 242. An endpoints field 247 of the segment records 242 define endpoints of a line segment in the coordinate space 220. In this embodiment the coordinate of the coordinate space are in $\mathbb{R}^2$, the endpoints are represented in $\mathbb{R}^4$. As illustrated in FIG. 2, a defined segment "a" is associated with a line segment 222 in the coordinate space. A particular $(t_1, t_2)$ interval for a segment and the endpoints of the line segment in the coordinate space define a line segment in the trajectory space.

Figure 3:
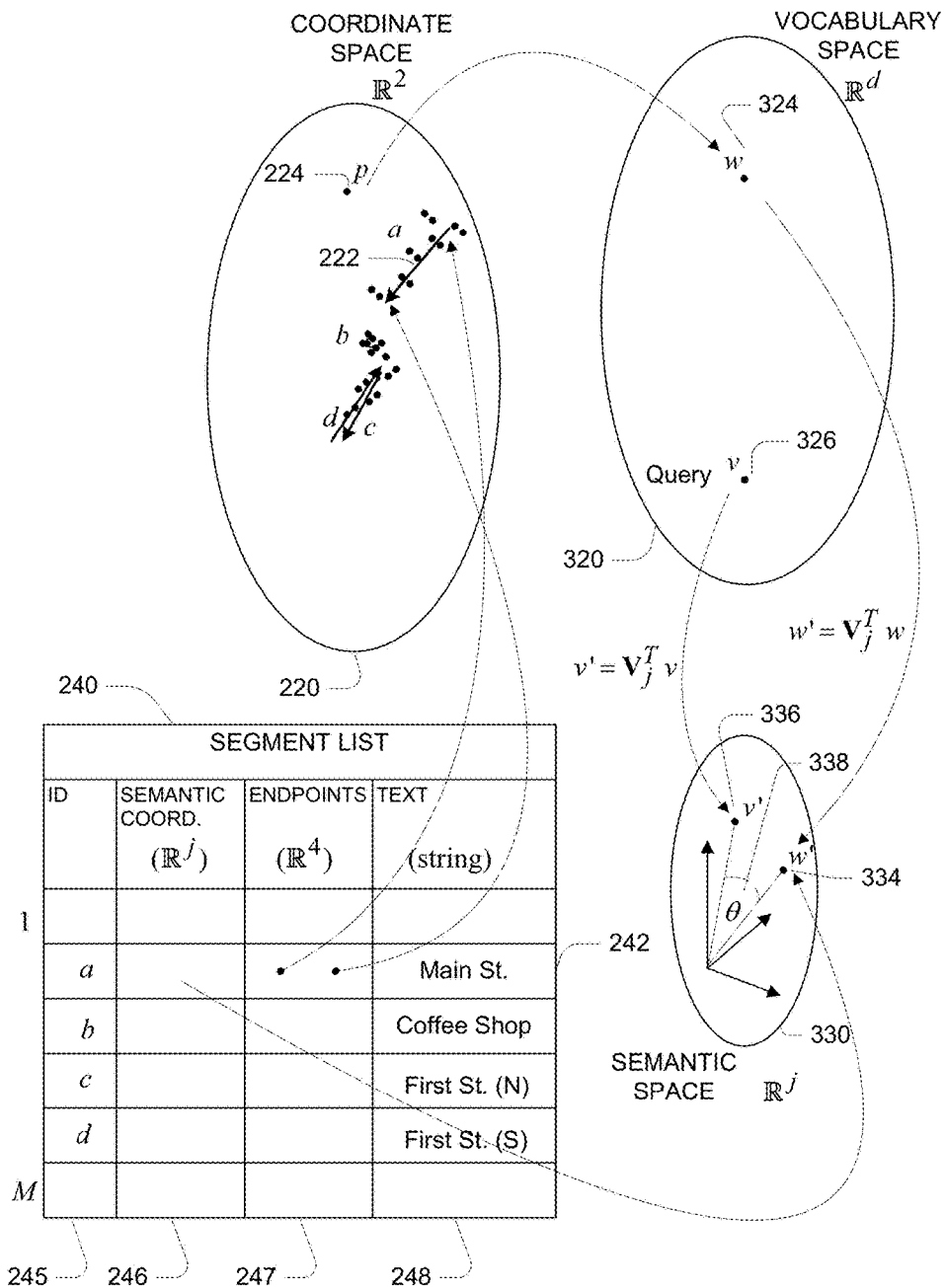

Continuing to defer a discussion of how the segment list 240 is constructed, referring to FIG. 3, each segment record 242 has a text description of that segment. In some implementations, an external data source 140 (see FIG. 1), for instance accessible over the public Internet, accepts coordinates of the segment 222 from the user device and provides back a text description. An example of such an external service is provided by Google Inc., which can accept a latitude and longitude specification and provide a textual description of the location, for example, in a JavaScript Object Notation (JSON) format, from which the text field for the segment is determined.

Each point or segment in the coordinate space is associated with a coordinate in "semantic" space 330. Generally, a point 334 in the semantic space 330 is associated with a point 224 in the coordinate space via a textual representation as a point 324 in a vocabulary space. In one implementation a point p 224 in the coordinate space 220 is mapped to a set of vocabulary items w 324 that are associated with that point based on an extended geocoding approach, generally using one or more external data sources 140 (see FIG. 1). For example, in addition to reverse geocoding information as used to determine the text description of a segment in the segment list 240, other sources such as web sites of businesses identified at the location, consumer reviews available online, etc., are used to determine the vocabulary set w. In some examples, the vocabulary set is represented as a vector in $\mathbb{R}^d$, where d is the total vocabulary size suitable for all segments, and each element of the vector is associated with one vocabulary item (e.g., word or prefined phrase). In some examples the entries in w indicate presence or absence of a vocabulary item (e.g., equal 0 or 1), while in other examples, a frequency or number of occurrences of the vocabulary item are indicated in an integer or real value.

A mapping from the vocabulary space 320 ($\mathbb{R}^d$) to a lower dimensional semantic space 330 ($\mathbb{R}^j$, $j \ll d$) is defined by a matrix transformation that takes a vector (324) $w \in \mathbb{R}^d$ and provides a vector (334) $w' \in \mathbb{R}^j$ according to $w'=V_j^T w$ where $V_j$ is a j column by d row matrix. In some examples, the columns of $V_j$ are orthogonal. Similarity between two vector representations, v and w, of vocabulary sets is then defined as a magnitude of an angle θ 338 between the mapped vectors v' and w' in the semantic space 330, for example, computed as $|v' \cdot w'|/\|v'\|\|w'\|$.

Using this mapping approach, a text-based query can be represented as a vocabulary vector v, and the degree of match of the query to each of the segments in the segment list 240 is defined according to the similarity between the mapped query $v' \in \mathbb{R}^j$ and the mapped vector $w' \in \mathbb{R}^j$ for each segment in the segment list 240. Note that the mapped vectors for the segments can be precomputed based on the coordinates of the segment in the coordinate space and the vocabulary set associated with those coordinates and stored in a semantic coordinate field 246 of the segment records 242.

Referring again to FIG. 2, a function of the system is construction of the segment list 240. In some examples, this segment list is constructed based on a set of samples in the trajectory space 210. Generally, the approach is based on representing the points in the trajectory space 210 as a set of K line segments, where each line segment in the trajectory space maps to corresponding line segment of a set of M<K line segments (or possibly singleton points) in the coordinate space 220. Note that M is the number of records in the segment list 240 that is constructed according to this procedure. In some examples, the values of K and M are chosen independently of the data from which the segment list is constructed. In other examples, these values are based on characteristics of the data itself.

One approach to determining the M line segments in the coordinate space is based on a clustering and iteration approach. Generally, the approach involves an initialization phase in which the samples in the trajectory space (i.e., position, time pairs) are approximated according to K line segments. These K line segments are then clustered into M clusters, and a representative line segment in the coordinate space is determined for each cluster. The iterative phase of the procedure involves alternating between two steps. First, the samples in the trajectory space are approximated by K line segments where each line segment is a mapping of one of the M segments in the coordinate space for a particular time interval. Second, the line segments in the coordinate space associated with each of the M clusters are updated based on the association of trajectory space points with the K line segments most recently determined. This iterative approach can be considered to be an example of an Estimate-Maximize (EM) algorithm. We now describe each of these steps in more detail.

As introduced above, the positioning system 122 (see FIG. 1) may produce very large number of samples P, and this large number of samples |P|=N may be too large or unwieldy to process to identify the K and M line segments discussed above. In some implementations, a coreset reduction approach is used to find a subset of samples $C \subset P$ such that K line segments determined from the samples C provide an approximation of the original samples P to within a multiple 1+ϵ of the optimal error of finding K line segments to represent the original points P. The procedure to process the P points according to selected values of K and ϵ to yield the corset samples C is described in the "DATA CORESET COMPRESSION" patent application and associated conference publication referenced above, which yields a coreset size $|C|=O(K/\epsilon^3) \log_2 N$. For reference, an algorithmic specification of an instance of the coreset procedure is provided in Appendix 1. Note that in other examples, other approaches to reducing the number of samples may be used. For example, a Douglas-Peucker heuristic (DPH) can be used. In yet other examples, as introduced above, all the original points are used rather than selection of a subset (e.g., coreset) upon which the remaining steps are performed.

In an implementation that makes use of the coreset procedure referenced above, a first step is constructions of the coreset C is the specification of K line segments that approximate the original points P. Each line segment in the trajectory space (i.e., in $\mathbb{R}^3$) is represented as a concatenation of the corresponding endpoints in the coordinate space (i.e., $\mathbb{R}^2$), such that the concatenation of the coordinate endpoints is a vector in $\mathbb{R}^4$. The set of K such concatenations is referred to as the set Q. The set Q is partitioned into M subsets $Q_1, \ldots, Q_M$, for example using a k-means procedure. Therefore, each line segment in the trajectory space maps to a line segment in the coordinate space, and that line segment is in one of the M clusters. Each position sample $p \in P \subset \mathbb{R}^3$ in the trajectory space is closest to one of the K line segments, and therefore can be labeled according to which of the M clusters that line segment is associated with.

In the discussion below, the procedure is described using all the original samples P, but the reader should understand that equivalently, the coreset samples C may be used. To complete the initialization, M subsets of points $P_{1,m} \in P$ for m=1. , , , . M are formed as the points that map to the $m^{th}$ cluster as discussed above.

In the $i^{th}$ iteration, starting at i=1 and ending at a predetermined index ($i_{end}$) or other stopping condition (e.g., based on convergence of the solution), a 1-segment mean in the coordinate space (i.e., represented as a vector in $\mathbb{R}^4$) is computed from each subset of points, $a_{i,m} \leftarrow P_{i,m}$. Then based on this set of M line segments in the coordinate space, a (K,M)-segmentation (i.e., K segments in the trajectory space, with each of those segments mapping to one of M line segments in the coordinate space) is computed and referred to as f, for example, using a dynamic programming approach. Because each of the K line segments in the trajectory space is associated with one of the M line segments in the coordinate space, the points P are again partitioned into M subsets $P_{i+1,m} \in P$ for m=1. , , , . M according to their closest line segments in the trajectory space.

At the end of the iteration, the M 1-segment means $a_{i_{end},m}$ define the endpoints of the segments in the segment list (i.e., field 247 of the segment records 242 in the segment list 240, as shown in FIG. 2). Also, the position samples are also represented according to the sequence of K segments, each referencing one of the M segments, thereby forming data represented in the diary (i.e., in field 237 of the diary record 232 in the diary 230 in FIG. 2). The time interval for each of the K segments (field 238) is obtained from the result of the final (K,M) segmentation (e.g., as a result from the dynamic programming procedure). This procedure is summarized in Appendix 2.

Note that although the procedure described above can be considered a batch procedure in which the M segments and the K segments are found together for a previously collected set of points P, further position samples may be processed with a fixed segment list, for example, by continuing a dynamic programming procedure to effectively extend the diary beyond K segments. Further, the samples from the positioning system can continue to be reduced to a coreset, for example, using a streaming approach as described in the in the "DATA CORESET COMPRESSION" application and associated conference publication referenced above. In such examples, the segment list may be periodically updated, for example, by repeating the procedure described above, optionally beginning the iteration with the current definitions of the M segments.

As introduced above, data for multiple users may be combined to form the M segments by effectively using the same iterative procedure described above, for example, considering at least conceptually the samples from each user to be time concatenated one after the other. In some such examples, the position samples may be transmitted to a server computer where the M segments are determined, and then the segment list is distributed back from the server computer to the users' devices.

Referring again to FIG. 3, as introduced above, each segment in the segment list 240 is associated with a point in the semantic space 330. As introduced above, a segment is associated with a vocabulary vector $w \in \mathbb{R}^d$, which has a selection of d words or phrases (e.g., omitting certain common words such as "the", "of", etc.) which is mapped to a vector $w' \in \mathbb{R}^j$ in the semantic space according to $w' = V_j^T w$ where $V_j$ is a j column by d row matrix. In some examples, j=3 is used. One approach, which is related to Latent Semantic Analysis (LSA), to constructing the matrix $V_j$ is to begin with n "documents", and construct a n×d matrix A such that the $a_{i,j}$ entry is the frequency of vocabulary item j in document i. One decomposition of A is as a singular value decomposition (SVD) such that $A = UDV^T$ where D is diagonal with non-increasing values down the diagonal, and $U \in \mathbb{R}^{n \times d}$ and $V \in \mathbb{R}^{d \times d}$. The matrix $V_j$ is then defined as the first j columns of V. Equivalently, the columns of V are the eigenvectors of $A^T A$, again with the columns arranged from largest to smallest eigenvalue. Various alternatives may be used for selection of "documents". In some alternatives, the documents include a set of online "reviews" of businesses or other services (e.g., "Yelp"). In some alternatives, text associated with locations visited by the user or a cohort of users is used as the document set. Approaches other than SVD may be used to define a mapping from a large vocabulary space to a low-dimensional semantic space. For example, principle components analysis can be used.

Having analyzed a user's travels according to the method described above, the sequence of segment identifiers can be analyzed as a Markov sequence (i.e., a Markov Chain). In an example, each segment is associated with a segment (e.g., in a one-to-one relationship) and transition probabilities are estimated from sequence information in the diary. In some examples, a hierarchical model may be formed, for example, with regions of relatively highly linked states that are less frequently traveled between. In this way a user's diary may be hierarchically structured with more detail available if the user desires to see it.

Figure 4A:
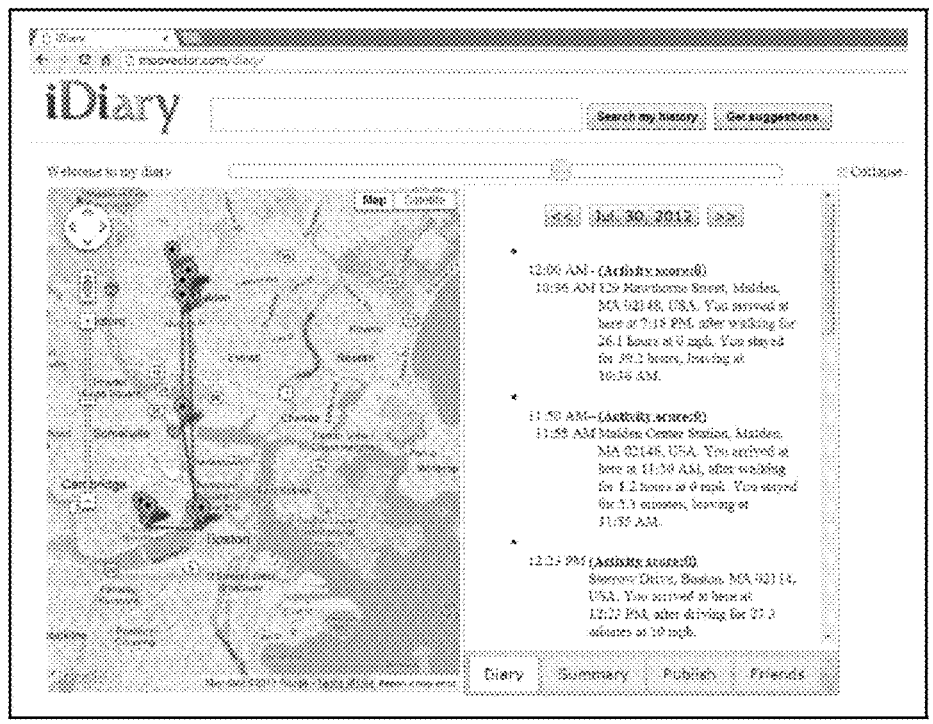
FIGS. 4A-C are output screens of a user interface.
Figure 4B:
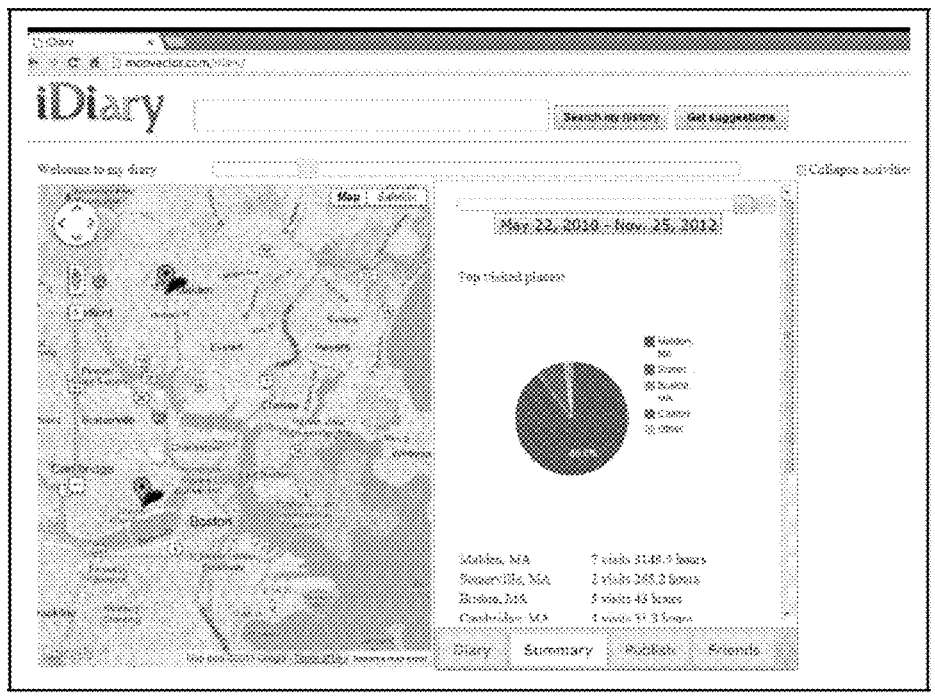
Figure 4C:
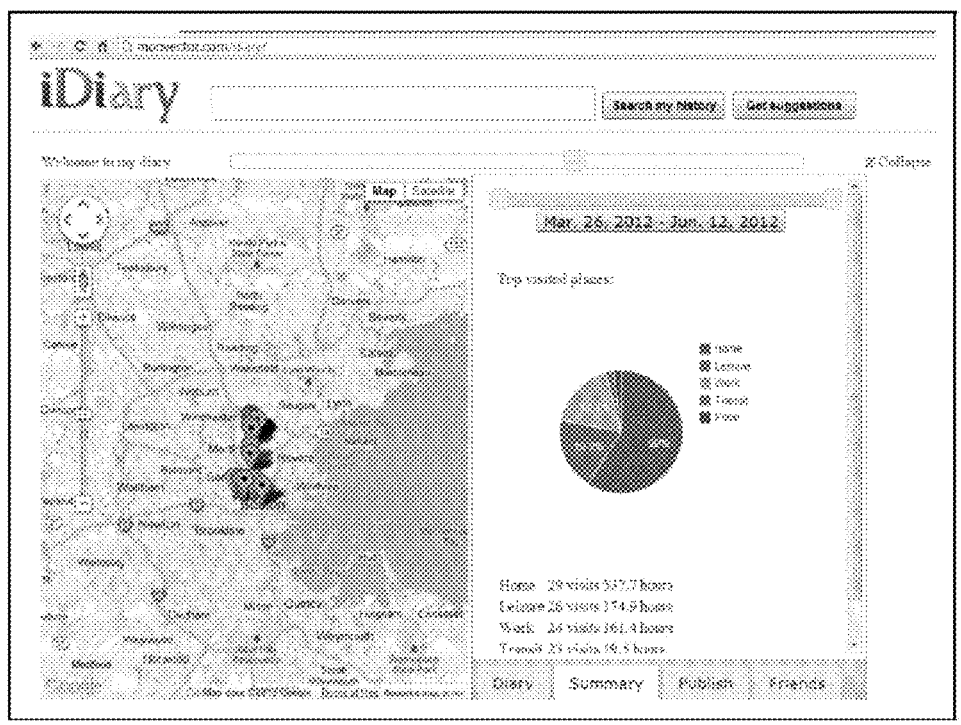

The user interface can provide one or more of a number of capabilities described below. In one example, the coreset reduced positions are sent to a server computer, which performs the analysis and segmentation for the user's travels. After the user sends his GPS points to the server (e.g., via a smart phone application "app") he can browse his data by logging to a web site using the smart phone or any other internet browser. FIGS. 4A-C show snapshots from the web application.

After logging in, the user gets the screen in which a map on the left corresponds to GPS coordinates of the user's trajectory. To the right of the map is a list of visited places, sorted by visiting time. A mode of transportation (e.g., walking, driving, or flying) is based on thresholds on the distances between the GPS points. The user can browse through the diary using the arrows above the text, or by pressing the date box and choosing a new date from a pop-up calendar. The interface includes a resolution slider that allows users to control the number of points shown on the map and a time frame slider for changing the start/end time of the descriptions.

Referring to FIG. 4A, an auto-generated text that describes the user trajectories as a diary. The user can change relevant time interval, and details resolution of the map using the sliders. Referring to FIG. 4B, text summary indicates places that were visited on a given time interval. A Pie-chart above the list represents the fraction of time each place was visited. Referring to FIG. 4C, a summary of visited businesses can be replaced by summary of activities (Food, Leisure, etc), using the category that is assigned to each business visited.

In addition to viewing his diary, the user can input text queries on the position data in free form ("Where did I last buy books?"). The output is a list of relevant locations that he has visited. When the user submits such a text query search on the top of the screen, the terms in the query are translated into a (sparse) vector of code words. This vector is projected on the semantic space and replaced by its (dense) semantic-vector of activities. On the semantic space, the application computes the similar locations (closest vectors) to the query and returns them. For example, the results after typing the query "restaurants" in the search text box provides a map of the restaurants visited, even if they don't have the word "restaurant" in their names.

In this example, the word "restaurant" is projected onto the semantic space that was constructed off-line, as explained in the previous paragraph, and is replaced by a vector in this space. This vector effectively assigns high weights for words in English that have strong correlation to "restaurant" in online reviews (e.g., in Yelp). Each business in the online reviews also corresponds to a point in the semantic space. The output of the query are the businesses that correspond to the points which are closest to the query point.

When the user presses the "Summary" button, the output results are aggregated according to locations rather than time. The sum of visited hours is displayed for every place in the list. Based on this list, a pie-chart shows the fraction of time spent in each place. The fraction is with respect to the time interval that is defined above the chart, which can be modified using a slider bar.

Each business also contains a category of a related activity: "Food", "Entertainment", etc. When the user checks the "Collapse activities" check box, the system aggregates the visited businesses in the previous paragraph according to their activities and shows them in a list or a pie-chart. If the user checks the "Collapse activities" box while in the "Diary" tab, a similar aggregation appears as text on the diary.

A variety of other applications can be based on the approached described above. For example, an automatic map building application can used the (K,M) segmentation approach using position logs from multiple users (e.g., a fleet of taxi cabs). As the users traverse the city streets, the data shows repeated traversals of common segments, which would be clustered together. Such automatic mapping can be applied to create maps from scratch, or to augment or correct maps used by navigation systems without necessarily requiring human intervention.

Another application relates to identification of user groups or other linkages between users according to the commonality of their segmented trajectories. For examples, two users that frequent the same locations (e.g., school buildings, restaurants) may be linked more strongly that users with little commonality in their trajectories.

Implementations of the approaches described above may be implemented in software, including instructions stored on a non-transitory computer readable medium. The software includes components for execution on a user's mobile device (e.g., smart phone), which includes a software accessible positioning system and a user interface for interacting with the user. The software optionally includes components for execution on a server computer that is accessible from the user's mobile device via a wireless data network (e.g., over a cellular telephone infrastructure), such that software at the server and the software at the user's device can work together to provide the overall functionality described above. In some implementations, the user's device and/or the server computer communicate over a data network with information/data sources which provide text-based information related to the position or trajectory information provided to them over the data network.

APPENDIX 1—CORESET(P,K,ϵ) PROCEDURE

Input: A sequence $P=p_i, p_2, \ldots, p_N$ samples in $\mathbb{R}^d$ (e.g., d=3)
Output: A (K,ϵ) coreset (C,w) for P with high probability.
 1. Compute the k-segment mean f of P
 2. Set $P' \leftarrow \{f(t)|p_t \in P\}$, the projection of P on f
 3. Foreach $p_t \in P$ do a. $$s(p) \leftarrow \frac{\|f(t) - p_t\|^2}{\sum_{p \in P} \|f(t) - p_t\|^2}$$

4. Pick a non-uniform random sample T of $\lceil 16dk/\epsilon^2 \rceil$ points from P, where for every $p \in P$ and $q \in T$ we have p=q with probability s(p)
 5. $C \leftarrow P' \cup T \cup \{f(t)|p_t \in T\}$
 6. Foreach $p_t \in T$ do a. $$w(p) \leftarrow \frac{1}{|T| \cdot s(p)}$$

b. $w(f(p_t)) \leftarrow -w(p)$

7. Foreacheach $p \in P'$ do
   a. $w(p) \leftarrow 1$
 8. Return (C,w).

APPENDIX 2—KM-MEAN(P,K,M,$i_{end}$) PROCEDURE

Input: A sequence $P=p_1, p_2, \ldots, p_N$ samples in $\mathbb{R}^d$ (e.g., d=3)
Output: A (K,M) segmentation of P
 1. Compute the K-segment mean $f_0$ of P
 2. $Q \leftarrow K$ points in $\mathbb{R}^4$ that corresponds to the concatenated k vertices of $f_0$
 3. Compute the M-means (points) clustering $Q_1, \ldots, Q_M$ of Q
 4. Foreach $j \leftarrow 1$ to M
   a. $P_{1,j} \leftarrow$ the points of P whose projection is on a segment $\overline{p,q}$ where $p,q \in Q_j$
 5. Foreach $i \leftarrow 1$ to $i_{end}$
   a. Foreach $j \leftarrow 1$ to M
     i. $a_{i,j} \leftarrow$ the 1-segment mean of $P_{i,j}$
   b. $A_i \leftarrow \{a_{i,1}, \ldots, a_{i,M}\}$
   c. $f_i \leftarrow$ The optimal (K,M)-segment f of P whose projection is $A_i$
   d. Foreach $j \leftarrow 1$ to M
     i. $P_{i+1,j} \leftarrow$ points whose projections are closest to the j th projected segment of $f_i$, among its M projected segments It is to be understood that the foregoing description is intended to illustrate and not to limit the scope of the invention, which is defined by the scope of the appended claims. Other embodiments are within the scope of the following claims.

What is claimed is:

1. A method for use in processing location data collected with a mobile device having a positioning system to form a text characterization, the method comprising:
accepting trajectory data representing successive geographic positions of the mobile device, said successive geographic positions being associated with corresponding times and at least some geographic positions of the successive geographic positions represented in the accepted trajectory data representing repeated traversals of a first geographic region;
determining a set of coordinate segments represented in the accepted trajectory data, a plurality of subsets of geographic positions of the successive geographic positions of the accepted trajectory data together representing repeated traversals of at least some coordinate segments of the set of coordinate segments, wherein a first coordinate segment of the set of coordinate segments is associated with the first geographic region and is represented in a first subset of geographic positions of the plurality of subsets of geographic positions, the first subset of geographic positions including
 a first set of successive geographic positions from the first subset of geographic positions representing a first traversal of the first geographic region associated with the first coordinate segment of the set of coordinate segments, and
 a second set of successive geographic positions from the first subset of geographic positions representing a second traversal of the first geographic region associated with the first coordinate segment of the set of coordinate segments;
associating a textual characterization with each segment of the determined set of coordinate segments; and
forming and storing a representation of the accepted trajectory data using the textual characterizations associated with the coordinate segments of the determined set of coordinate segments.

2. The method of claim 1 wherein forming and storing the representation of the accepted trajectory data includes forming and storing a data representation that includes a sequence of records, each record including a reference to one coordinate segment of the set of coordinate segments, and a specification of a time interval associated with a traversal of successive geographic positions in the accepted trajectory data associated with the referenced coordinate segment.

3. The method of claim 2 wherein the reference to the one coordinate segment of the set of coordinate segments provides a reference to stored data representing the textual characterization of the one coordinate segment of the set of coordinate segments.

4. The method of claim 1 further comprising:
providing a textual summary of the accepted trajectory data using the stored representation of the accepted trajectory data.

5. The method of claim 1 wherein determining the set of coordinate segments representing in the accepted trajectory data includes:
identifying a set of trajectory segments in a trajectory space representing the successive geographic positions, each trajectory segment of the set of trajectory segments representing a temporal traversal from a first geographic position to a second geographic position from a first time to a second time; and
for each trajectory segment in the trajectory space identifying a corresponding coordinate segment in a coordinate space, wherein the coordinate segment in the coordinate space represents one or more traversals from a first geographic position to a second geographic position;
wherein for at least some coordinate segments in the coordinate space, multiple trajectory segments in the trajectory space correspond to the coordinate segment in the coordinate space representing multiple instances in the accepted trajectory data of traversal of the coordinate segment in the coordinate space.

6. The method of claim 5 wherein identifying the set of trajectory segments in the trajectory space and the coordinate segments in the coordinate space includes applying an optimization procedure to jointly determine the set of trajectory segments in the trajectory space and the coordinate segments in the coordinate space.

7. The method of claim 6 wherein determining the set of coordinate segments includes selecting a number (K) of trajectory segments of the set of trajectory segments in the trajectory space and selecting a number (M) of coordinate segments in the coordinate space, and applying the optimization procedure includes optimizing a match of the selected trajectory segments in the trajectory space to the successive geographic positions in the accepted trajectory data according to the selected numbers of segments.

8. The method of claim 5 wherein associating the textual characterization with a segment of the determined set of coordinate segments includes:
determining at least one geographic position associated with the coordinate segment;
providing the geographic position to data source; and
receiving data including the textual characterization from the data source.

9. The method of claim 1 further comprising:
accepting a text based query associated with the accepted trajectory data; and
determining a response to the query using the stored representation of the trajectory data.

10. The method of claim 9 wherein determining the response includes computing a mapping of the text based query to a numerical vector, and comparing the computed numerical vector with a numerical vector determined from the textual characterizations of coordinate segments of the determined set of coordinate segments representing the accepted trajectory data.

11. The method of claim 9 further comprising performing a latent semantic analysis using text associated with the coordinate segments, and wherein determining the response to the query uses a result of the latent semantic analysis.

12. The method of claim 1 further comprising identifying a subset of the accepted trajectory data, and determining the set of coordinate segments includes identifying coordinate segments of the set of coordinate segments to represent the subset of the accepted trajectory data.

13. The method of claim 12 wherein identifying the subset of the accepted trajectory data includes:
applying a computer-implemented compression procedure to the accepted trajectory data to form the subset of the accepted trajectory data representing a subset of the geographic positions represented in the accepted trajectory data, the number of positions in the subset of geographic positions having a number substantially smaller than the first number of geographic positions in the accepted trajectory data and providing a bound on an error associated with representing the accepted trajectory data by the subject of the trajectory data.

14. The method of claim 13 wherein applying the compression procedure includes:
determining a first plurality of segments in a trajectory space according to a procedure with a property that the number of segments in the first plurality of segments grows at most as a logarithm of the number of successive geographic positions represented in the accepted trajectory data;
partitioning the successive geographic positions into a plurality of parts each part being associated with a corresponding different segment of the first plurality of segments in the trajectory space;
for each part of the plurality of parts, selecting a subset of the successive geographic positions; and
combining the selected subsets to form the subset of geographic positions represented in the subset of the accepted trajectory data.

15. The method of claim 1 executed on a processor in the mobile device.

16. The method of claim 1 wherein accepting the trajectory data comprises accepting said data at a server computer over a wireless data network from the mobile device, and determining the set of coordinate segments at the server computer.

17. The method of claim 1 further comprising forming a statistical characterization of the sequence of coordinate segments represented in the accepted trajectory data.

18. The method of claim 1 further comprising accepting trajectory data from a plurality of mobile devices, and determining the set of coordinate segments to represent the accepted trajectory data from the plurality of mobile device.

19. The method of claim 1 wherein the first set of successive geographic positions is associated with a first set of corresponding times from the accepted trajectory data, and the second set of successive geographic positions is associated with a second set of corresponding times from the accepted trajectory data, the first set of corresponding times and the second set of corresponding times being mutually exclusive.

20. Software stored on a non-volatile computer-readable medium for causing a processing system to
accept trajectory data representing successive geographic positions of a mobile device, said successive geographic positions being associated with corresponding times and at least some geographic positions of the successive geographic positions represented in the accepted trajectory data representing repeated traversals of a first geographic region;
determine a set of coordinate segments represented in the accepted trajectory data, a plurality of subsets of geographic positions of the successive geographic positions of the accepted trajectory data together representing repeated traversals of at least some coordinate segments of the set of coordinate segments, wherein a first coordinate segment of the set of coordinate segments is associated with the first geographic region and is represented in a first subset of geographic positions of the plurality of subsets of geographic positions, the first subset of geographic positions including
- a first set of successive geographic positions from the first subset of geographic positions representing a first traversal of the first geographic region associated with the first coordinate segment of the set of coordinate segments, and
- a second set of successive geographic positions from the first subset of geographic positions representing a second traversal of the first geographic region associated with the first coordinate segment of the set of coordinate segments;

associate a textual characterization with each segment of the determined set of coordinate segments; and form and store a representation of the accepted trajectory data using the textual characterization associated with the coordinate segments of the determined set of coordinate segments.

21. The software of claim 20 further causing the processing system to:
- accept from the mobile device a text based query associated the with accepted trajectory data;
- determine a response to the query using the stored representation of the accepted trajectory data; and
- provide the response to the mobile device.

22. A method for use in processing location data collected with a mobile device having a positioning system to form a text characterization, the method comprising:
- accepting trajectory data representing successive geographic positions of the mobile device, said successive geographic positions being associated with corresponding times and at least some geographic positions of the successive geographic positions represented in the accepted trajectory data representing repeated traversals of a first geographic region;
- determining a set of coordinate segments represented in the accepted trajectory data, a plurality of subsets of geographic positions of the successive geographic positions of the accepted trajectory data together representing repeated traversals of at least some coordinate segments of the set of coordinate segments, wherein a first coordinate segment of the set of coordinate segments is associated with the first geographic region and is represented in a first subset of geographic positions of the plurality of subsets of geographic positions, the first subset of geographic positions including
  - a first set of successive geographic positions from the first subset of geographic positions gathered over a first time interval corresponds to a first traversal of the first geographic region associated with the first coordinate segment of the set of coordinate segments, and
  - a second set of successive geographic positions from the first subset of geographic positions gathered over a second time interval corresponds to a second traversal of the first geographic region associated with the first coordinate segment of the set of coordinate segments;
- associating a textual characterization with each segment of the determined set of coordinate segments; and
- forming and storing a representation of the accepted trajectory data using the textual characterizations associated with the coordinate segments of the determined set of coordinate segments.

\* \* \* \* \*